United States Patent [19]
Danielsson et al.

[11] 3,985,443
[45] Oct. 12, 1976

[54] METHOD OF OBTAINING STIGMATIC IMAGING IN SPECTRAL ANALYSIS USING A CONCAVE GRATING

[76] Inventors: Nils Allan Danielsson, Angsvagen 7, S-191 45 Sollentuna, Sweden; Karl-Peter Christian Lindblom, Brinkasvagen 1, 21660 Nagu, Finland

[22] Filed: June 4, 1975

[21] Appl. No.: 583,674

[30] Foreign Application Priority Data
June 4, 1974 Finland............... 1702/74

[52] U.S. Cl................ 356/99; 350/162 R; 356/79
[51] Int. Cl.²........................... G01J 3/12
[58] Field of Search............ 356/79, 99, 100, 101; 350/162 R

[56] References Cited
UNITED STATES PATENTS
3,775,010  11/1973  Chupp et al.............. 356/101
3,865,490  2/1975  Grossman.............. 356/79

*Primary Examiner*—Vincent P. McGraw
*Attorney, Agent, or Firm*—Biebel, French & Nauman

[57] ABSTRACT

The invention relates to a method of obtaining stigmatic imaging in spectral analysis using a concave grating in offplane mounts. The invention comprises placing on one hand the object, which may be an entrance slit, and on the other the focal surface in such a manner with respect to the concave grating that certain conditions specified in disclosed formulae and relating to an othogonal three dimensional coordinate system the origo of which lies in the middle of the grating surface, the X-axis of which runs along the normal to the grating surface, and the Z-axis of which is parallel with the grooves of the grating, are satisfied at a value for the angle between the XY-plane and a line from a selected point on the object to origo that differs from zero.

4 Claims, 1 Drawing Figure

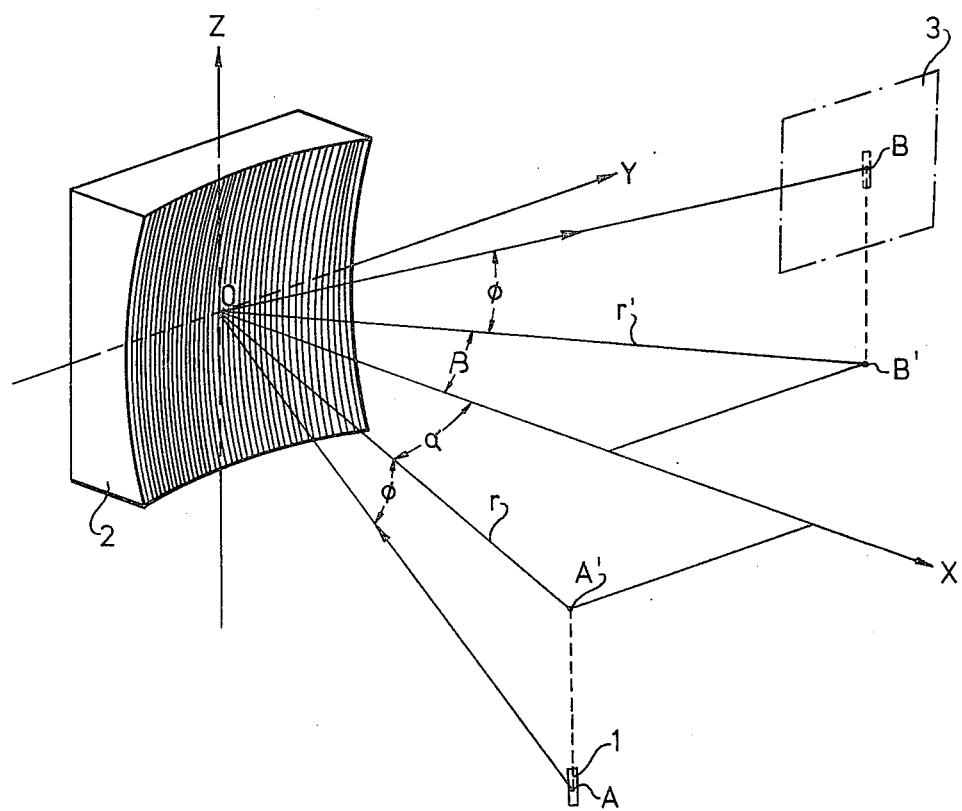

METHOD OF OBTAINING STIGMATIC IMAGING IN SPECTRAL ANALYSIS USING A CONCAVE GRATING

FIELD OF THE INVENTION

The present invention relates to a method of obtaining stigmatic imaging in spectral analysis using a concave grating.

DESCRIPTION OF THE PRIOR ART

The use of concave gratings in spectral analysis for the wave-length dispersion of radiation is previously known. In spectrographs where concave gratings are used the entrance slit is arranged in such a way that the incident radiation that passes the entrance slit hits the concave grating. The concave grating disperces the wave-length components of the radiation in different directions and images for every single wave-length component the entrance slit on a focal surface.

Most of the concave grating mounts are so called in-plane mounts, i.e. the entrance slit is placed in the plane that contains the normal to the grating surface through its middle point and which plane also is orthogonal to the grooves of the concave grating in said point. This plane is called the Rowland-plane. It is known that the dominating aberration in such mounts is so called astigmatism which means that every single point on the entrance slit is imaged as a line on the focal surface.

In most applications in spectroscopy it is desirable to obtain stigmatic imaging. Applications where stigmatic imaging is especially important are for instance when several spectral orders from the concave grating are separated on the focal surface with the aid of a wavelength dispersing element, the wavelength dispersion of which is orthogonal to that of the concave grating. Furthermore stigmatic imaging is desirable when photographic recording is used and when the recording of the spectrum is made through so called photodiods and phototransistors. Stigmatic imaging also makes possible the study of the intensity distribution from different parts of a light-source.

It has been proposed earlier to achieve stigmatic imaging by the use of a spherical concave grating. In this so called Wadsworth-mount the radiation that is incident on the grating is collimated, and the grating is arranged in such a way that the diffracted radiation emerges in the direction of the normal to the grating. This well known mount requires the use of additional means, such as a concave mirror in order to achieve the collimation of the incident radiation.

It has further been proposed to eliminate astigmatism by means of compensating optical components, such as a cylindrical lens. Still further it has been proposed to correct astigmatism by gratings, the surfaces of which do not have spherical shapes. Such so called aspherical gratings are for instance gratings with toroidal and ellipsoidal surfaces. These optical surfaces are however expensive and hard to produce.

All these known proposals for elimination of astigmatism have been so called in-plane mounts.

SUMMARY OF THE INVENTION

The purpose of the present invention is to achieve a new method of producing stigmatic imaging of an object on a focal surface in spectral analysis by using a concave grating, without being restricted to in-plane mounts. The method of the invention is performed by placing on one hand the object, an entrance aperture, an image and a virtual image considerable as the object, and on the other hand the focal surface in such a manner with respect to the concave grating that the following conditions are satisfied.

$$\tan^2 \phi = \frac{R_2}{R_1} + \sin\alpha \cdot \sin\beta - 1$$

$$\frac{1}{r} = \left\{ \frac{\sin\beta (\cos\alpha + \cos\beta)}{\sin\alpha + \sin\beta} \right\} \left\{ \frac{1}{R_1} + \frac{\sin\alpha \cdot \sin\beta}{R_2} \right\}$$

$$\frac{1}{r'} = \left\{ \frac{\sin\alpha (\cos\alpha + \cos\beta)}{\sin\alpha + \sin\beta} \right\} \left\{ \frac{1}{R_1} + \frac{\sin\alpha \cdot \sin\beta}{R_2} \right\}$$

at value for $\phi$ that differs from zero, in which formulae the various symbols denote the following quantities in an orthogonal three dimensional coordinate system the origo of which lies in the middle of the grating surface of the concave grating and where the X-axis runs along the normal to the grating surface and the Z-axis is parallel with the grooves of the grating:

$\phi$ = the angle between the XY-plane and a line from a selected point on the object to origo $\alpha$ = the angle between the X-axis and a line connecting origo and the projection point in the XY-plane of said object point, $r$ = the distance between origo (O) and the projection point in the XY-plane of said object point $\beta$ = the angle between origo and the projection point in the XY-plane of that point on the focal surface which is hit by a ray emerging from said object point to origo after reflection through diffraction, $r'$ = the distance from origo to said projection point in the XY-plane of said point on the focal surface, $R_1$ = the radius of curvature in origo of the curve of intersection between said grating surface and the XY-plane, $R_2$ = the radius of curvature in origo of the curve of intersection between said grating surface and the XY-plane, the angles $\alpha$ and $\beta$ having the same sign if said object point and said point on the focal surface lie on the same side of the XZ-plane.

SHORT DESCRIPTION OF THE DRAWING

The invention is described below with reference to the enclosed schematic drawing, that shows an orthogonal three dimensional coordinate system which includes a schematically shown object, a concave grating and a focal surface.

DESCRIPTION OF THE PREFERRED EMBODIMENTS

In the drawing 1 denotes an object, which in the shown case is an entrance slit for the radiation, 2 denotes a concave grating which in a known way is provided with mutually parallel equidistant grooves and 3 denotes of focal surface. On the drawing is also shown an orthogonal three dimensional coordinate system the origo O of which is placed in the center of the grating surface of the grating 2, one axis of the system, the X-axis, runs along the normal to the grating surface and another axis, the Z-axis, is parallel to the grooves of the grating 2. Thus the direction of the third axis of the coordinate system, the Y-axis, is defined symbol. A denotes any point chosen in the entrance slit 1, for instance its middle point, and B denotes the point on the focal surface 3 which is hit by the ray emerging from the point A to the middle point of the grating surface O, as indicated by an arrow on the drawing, after reflection and diffraction from the concave grating 2. Symbol $\phi$ indicates the angle between the ray AO and a plane through the X- and Y-axises of the coordinate system or the XY-plane. Symbol $\alpha$ denotes the angle between the X-axis on one hand and the line of intersection between the plane through the point A and the Z-axis and the XY-plane on the other hand. Symbol $\beta$ denotes the angle between the X-axis on one hand and the line of intersection between a plane through the point B and the Z-axis and the XY-plane on the other hand, whereby the angle $\beta$ shall have the same sign as the angle $\alpha$ if the point B is situated on the same side of the XZ-plane as the point A. Symbol r denotes the distance from origo O to the projection point A' of the point A in the XY-plane and r' denotes the distance from origo to the projection point B' of the point B in the XY-plane.

According to the invention the entrance apperture 1 is arranged in such a way in relation to the concave grating 2 that the conditions defined in the formulae below are satisfied for a point A in the entrance apperture 1 and the corresponding point B on the focal surface 3, respectively, at a value of $\phi$ that differs from zero.

(I) $\qquad \tan^2 \phi = \frac{R_2}{R_1} + \sin\alpha \cdot \sin\beta - 1$ (II) $\qquad \frac{1}{r} = \left\{ \frac{\sin\beta\,(\cos\alpha + \cos\beta)}{\sin\alpha + \sin\beta} \right\} \left\{ \frac{1}{R_1} + \frac{\sin\alpha \cdot \sin\beta}{R_2} \right\}$ (III) $\qquad \frac{1}{r'} = \left\{ \frac{\sin\alpha\,(\cos\alpha + \cos\beta)}{\sin\alpha + \sin\beta} \right\} \left\{ \frac{1}{R_1} + \frac{\sin\alpha \cdot \sin\beta}{R_2} \right\}$ In the given formulas symbols $\phi$, $\alpha$, $\beta$, $r$, $r'$ represent the quantitives given above. In addition $R_1$ denotes the radius of curvature in origo O of the curve of intersection between the grating surface and the XY-plane, and $R_2$ denotes the radius of curvature in origo O of the curve of intersection between the grating surface and the XZ-plane.

The fact that $\phi$ in the formulae above has a value that differs from zero means that the entrance slit 1 is arranged in a so called off-plane mount. The use of off-plane mounts have previously been suggested in connection with concave grating but with the purpose to obtain compact arrangements, such as is the case in the so called off-plane Eagle-mount. This previously known off-plane mount has neither been used for correction of astigmatism nor have stigmatic images been obtained. In accordance with the present invention, however, the off-plane mount is applied in order to, without the use of further means, render it possible to choose a mount that with many degrees of freedom results in stigmatic imaging, using a great number of different types of concave gratings.

Thus for instance the invention can be applied to the previously mentioned known off-plane Eagle mount implying that $\alpha = \beta$ in the formulas (I), (II) and (III), where the use of both aspherical gratings as for instance toroidal, elipsoidal or paraboloidal gratings, and spherical gratings as well, is possible. The formulae (I), (II), (III) then read when $\alpha = \beta$ (IV) $\qquad \tan^2 \phi = \frac{R_2}{R_1} - \cos^2 \alpha$ (V) $\qquad \frac{1}{r} = \cos\alpha \left\{ \frac{1}{R_1} + \frac{\sin^2 \alpha}{R_2} \right\}$ (VI) $\qquad r' = r$ If reduction of other aberrations than astigmatism is taken into consideration, it may be desirable to work with a small off-plane angle $\phi$ keeping the angles $\alpha$ and $\beta$ large, which thus is possible according to the invention through the choice of suitable aspherical gratings where $R_1$ and $R_2$ have different values.

It is also possible to eliminate astigmatism by the use of spherical and for instance paraboloidal gratings in which case $R_1 = R_2$, at relatively small off-plane angles $\phi$ providing the angles $\alpha$ and $\beta$ are chosen relatively small, below 30°. For these grating surfaces or similar being rotation symetrical with respect to the X-axis the formulae I, II and III then become:

(VII) $\qquad \tan^2 \phi = \sin\alpha \, \sin\beta$ (VIII) $\qquad \frac{1}{r} = \frac{\sin\beta\,(\cos\alpha + \cos\beta)(1 + \sin\alpha \cdot \sin\beta)}{R(\sin\alpha + \sin\beta)}$ (IX) $\qquad \frac{1}{r'} = \frac{\sin\alpha\,(\cos\alpha + \cos\beta)(1 + \sin\alpha \cdot \sin\alpha)}{R(\sin\alpha + \sin\beta)}$ where the notation $R = R_1 = R_2$ has been used. When such arrangements are done for which $\alpha = \beta$, the formulae VII, VIII, IX become (X) $\qquad \tan \phi = \pm \sin\alpha$ (XI) $\qquad r = \frac{R}{\cos\alpha\,(1 + \sin^2 \alpha)}$ (XII) $\qquad r' = r$ Among the different possibilities of stigmatic imaging using concave gratings that the invention offers, those with spherical concave gratings (formulae VII–IX) are most attractive, because such gratings are most commonly used.

The use of spherical gratings according to the invention, in mounts with $\alpha = \beta$ (formulae X, XI and XII) are especially attractive because one can show that the aberration known as coma depends only on the height of the grating i.e. of the length of the grating grooves. It can also be shown that this aberration is small if $\alpha = \beta$ are chosen small.

Such a stigmatic concave grating mount according to the invention for the production of the spectrum in the vicinity of the wave-length 1000 A in the first spectral order involving a spherical concave grating the radius of curvature of which is 1000 mm and the groove density 2400 grooves/mm is obtained if one for instance chooses $\alpha = \beta$ 7.0°. The formulae X, XI and XII the give $\phi = 6.948$, $r' = r = 992.72$ mm. Because the angles $\alpha = \beta$ are only 7°, the stigmatic mount is also almost free from the comatic aberration.

With spherical concave gratings used according to the invention the same advantages are achieved as at present by the use of plane grating mounts of the so called Czerny-Turner or Ebert-types, but in a much simpler realisation. For the radiation in the extreme ultraviolet region the invention means quite new possibilities in producing stigmatic spectra with the least possible number of reflecting optical components.

The invention is not restricted to the examples described but mounts according to the invention can also be parts of other optical systems in which other optical components than just a concave grating may be used as well, and the invention can also be varied in different ways within the scope of the following claims.

We claim:

1. A method of obtaining stigmatic imaging of an object on a focal suurface at wave-length dispersion of radiation using a concave grating, comprising placing on one hand the object, an entrance aperture, an image and a virtual image considerable as the object, and on the other hand the focal surface in such a manner with respect to the concave grating that the following conditions are satisfied $$\tan^2 \phi = \frac{R_2}{R_1} + \sin \alpha \cdot \sin \beta - 1$$

$$\frac{1}{r} = \left\{ \frac{\sin\beta (\cos\alpha + \cos\beta)}{\sin\alpha + \sin\beta} \right\} \left\{ \frac{1}{R_1} + \frac{\sin \alpha \cdot \sin \beta}{R_2} \right\}$$

$$\frac{1}{r'} = \left\{ \frac{\sin\alpha (\cos\alpha + \cos\beta)}{\sin\alpha + \sin\beta} \right\} \left\{ \frac{1}{R_1} - \frac{\sin \alpha \cdot \sin \beta}{R_2} \right\}$$

at a value for $\phi$ that differs from zero, in which formulae the various symbols denote the following quantities in an orthogonal three dimensional coordinate system the origo of which lies in the middle of the grating surface of the concave grating and where the X-axis runs along the normal to the grating surface and the Z-axis is parallel with the grooves of the grating:

$\phi$ = the angle between the XY-plane and a line from a selected point on the object to origo $\alpha$ = the angle between the X-axis and a line connecting origo and the projection point in the XY-plane of said object point, $r$ = the distance between origo (O) and the projection point in the XY-plane of said object point, $\beta$ = the angle between origo and the projection point in the XY-plane of that point on the focal surface, which is hit by a ray emerging from said object point to origo after reflection through diffraction, $r'$ = the distance from origo to said projection point in the XY-plane of said point on the focal surface, $R_1$ = the radius of curvature in origo of the curve of intersection between said grating surface and the XY-plane, $R_2$ = the radius of curvature in origo of the curve of intersection between said grating surface and the XZ-plane, the angles $\alpha$ and $\beta$ having the same sign if said object point and said point on the focal surface lie on the same side of the XZ-plane.

2. A method as in claim 1, comprising placing said object, entrance aperture, image and virtual image considerable as the object so with respect to said concave grating that $\alpha = \beta$.

3. A method as in claim 1, comprising shaping the surface of said grating such that $R_1 = R_2$.

4. A method as in claim 3, comprising shaping said grating to have a spherical grating surface.

* * * * *